UNITED STATES PATENT OFFICE.

CONRAD SEMPER, OF PHILADELPHIA, PENNSYLVANIA, ASSIGNOR TO HARRISON BROTHERS & CO., OF SAME PLACE.

MANUFACTURE OF SULPHATE OF ALUMINA.

SPECIFICATION forming part of Letters Patent No. 280,089, dated June 26, 1883.

Application filed January 16, 1883. (Specimens.)

*To all whom it may concern:*

Be it known that I, CONRAD SEMPER, of Philadelphia, in the State of Pennsylvania, have invented a certain new and useful Process in the Manufacture of Sulphate of Alumina; and I hereby declare the following to be a full and exact description of the same.

In the manufacture of sulphate of alumina the aluminous materials—such as schists, clays, &c.—are treated, as is well known, in the powdered state, either before or after roasting the same, with the requisite amount of either cold or hot sulphuric acid. In most cases a violent reaction will ensue, and the aluminous material will be decomposed by the action of the acid, by which silica will be set free, and a combination of alumina and of such other bases as may be present formed with the sulphuric acid, whereby will be produced a more or less pure sulphate of alumina. This product may either be run into cakes, which, after hardening and after being more or less broken up, will form an article of commerce known as "aluminous cake;" or after diluting said product formed by the treatment of aluminous materials with sulphuric acid with water the silica may be allowed to settle, the clear supernatant liquor drawn off and boiled down or concentrated to such a strength that it will get hard when cold. The product of each of these processes is the sulphate of alumina of commerce. It is, however, very difficult in the ordinary mode of manufacture to obtain a neutral product. It will generally contain more or less free acid. This free acid is a very objectionable feature, and is positively harmful when the alum cake or sulphate of alumina is to be used as a sizing material in the manufacture of paper. It will corrode the apparatus employed and destroy in a greater or less degree certain materials used in the manufacture of paper, such as ultramarine-blue. It is necessary to have a neutral or basic solution of sulphate of alumina if it is desired to remove iron therefrom by some of the known processes suitable for this purpose.

I am well aware that a process has been patented in which oxide of zinc is used as a neutralizing agent. It is, however, objectionable for some purposes for which alum is used to have a poisonous metallic substance present therein. To do away with these objectionable features and obtain a neutral or slightly-basic aluminous product suitable for various purposes, I treat the acid solution of sulphate of alumina while hot, either before or after the silica and other insoluble impurities have been removed therefrom, with a proper quantity of magnesic carbonate, bicarbonate, or oxide to neutralize the free acid present. I prefer, however, to use these materials slightly in excess. The magnesia will unite with the free acid as long as any remains, and after saturating all the free acid if any surplus of magnesia should be present it will take up from the neutral sulphate of alumina as much acid as will be necessary to transform all the magnesia present into a sulphate of magnesia, leaving a soluble basic sulphate of alumina intimately mixed with the sulphate of magnesia thus formed.

I wish it understood that aluminous sulphates containing free acid, of whatever origin they may be, can be treated in this way with the result above described.

Having thus described my invention, I claim—

The method of making a neutral or basic alumino-magnesian compound, which consists in treating a hot acid solution of sulphate of alumina with magnesic carbonate, bicarbonate, or oxide, as specified.

In testimony whereof I have hereunto signed my name this 15th day of January, A. D. 1883.

CONRAD SEMPER.

In presence of—
  W. C. STRAWBRIDGE,
  J. BONSALL TAYLOR.